United States Patent
Sands et al.

(10) Patent No.: US 7,542,845 B2
(45) Date of Patent: Jun. 2, 2009

(54) INFORMATION NAVIGATION INTERFACE

(75) Inventors: Ian Michael Sands, Seattle, WA (US);
Victor Kevin Russ, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 543 days.

(21) Appl. No.: 11/460,925

(22) Filed: Jul. 28, 2006

(65) Prior Publication Data

US 2007/0027618 A1 Feb. 1, 2007

Related U.S. Application Data

(60) Provisional application No. 60/703,548, filed on Jul. 29, 2005.

(51) Int. Cl.
*G01C 21/32* (2006.01)
*G06F 19/00* (2006.01)

(52) U.S. Cl. .............. 701/207; 701/211; 340/995.14; 715/830

(58) Field of Classification Search ............ 701/207, 701/211, 200, 1; 715/830, 841, 828; 340/995.14, 340/995.15, 995.16; 345/173
See application file for complete search history.

(56) References Cited

U.S. PATENT DOCUMENTS 5,588,105 A * 12/1996 Foster et al. ................ 715/779
6,281,899 B1 * 8/2001 Gould et al. ................ 715/848

* cited by examiner

*Primary Examiner*—Tan Q Nguyen
(74) *Attorney, Agent, or Firm*—Perkins Coie LLP

(57) ABSTRACT

The information navigation interface facilitates receiving an indication of a discrete physical contact event with a user input device. The contact event is associated with a user request for navigating an assembly of displayable information. A navigation action based on the received indication is then determined. The navigation action may include either (a) both scrolling and expansion of currently displayed information wherein the scrolling and expansion occur simultaneously or nearly simultaneously, or (b) both scrolling and contraction of currently displayed information wherein the scrolling and contraction occur simultaneously or nearly simultaneously. Once determined, the navigation action is applied, resulting in a display of a second portion of the assembly of information.

20 Claims, 7 Drawing Sheets

$35.96
$100.00
Mortgage REFI App
$2,750.00
CH Acct Inquiry
$8.47
$45.50
CR Acct Inquiry
$45.53
$85.06
$109.54

504

ATM QUICK DROP
CH Acct Inquiry

Notes (Brad H.):
$8.47

NYCE PUR
$45.50

CHECK # 00003648
CR Acct Inquiry

Notes (Marilyn J.):
$45.53

MAESTRO PUR
$85.06

CHECK # 00003634
$109.54

NYCE PUR
REFI Prequal

506

$45.50

CHECK # 00003648
Balance: $2,597.53

CR Acct Inquiry

Notes (Marilyn J.):
Customer
reporting lost
credit card $45.53

MAESTRO PUR
Balance: $2,743.03

INFORMATION NAVIGATION INTERFACE

CROSS-REFERENCE TO RELATED APPLICATION

This application claims priority to U.S. Application No. 60/703,548, filed Jul. 29, 2005, entitled "Device/Human Interactions, such as in Context-Aware Environments," which is herein incorporated by reference.

BACKGROUND

Computers and computing devices are finding their way into more and more aspects of daily life. For example, computing devices are found both inside the home (e.g., personal computers, media devices, communication devices, etc.) and outside the home (e.g., bank computers, supermarket checkout computers, computers in retail stores, computer billboards, computing devices relating to providing commercial services, computing devices in cars, etc.). Most of these computing devices have mechanisms that allow them to interact with humans and/or the environment at some level. Aspects of the way that computing devices interact with humans are sometimes referred to as a "user experience." For example, a human's satisfaction with a computing device interaction (or sequence of computing device interactions) may be based, at least in part, on the richness and/or productivity of the user experience. In some contexts, productivity may be linked with how easy it is to use and operate the computing device. Various aspects of the environment (including the physical environment in which the computing device operates and various physical aspects of the device itself may play a role in shaping the user experience.

SUMMARY

The methods and systems described herein facilitate providing navigation of an assembly or collection of information that is displayable on a computer screen or mobile device screen. For example, the methods and systems described herein may allow users of a bank application to easily navigate through layers and levels of customer information using single gesture-based user input commands. Some of these single gesture-based user input commands may translate into a navigation command that allows for both scrolling and expanding/contracting at the same time. For example, such navigation commands may be used to navigate significant amounts of chronological information, hierarchically arranged information, images, interactive maps, etc. This allows for great flexibility with respect to the amount and detail of information shown on a given screen at a given time.

BRIEF DESCRIPTION OF THE DRAWINGS

FIG. 5 is a display diagram showing another example of screen shots or views depicting seamless "zoom and scroll" navigation at a computing device.

DETAILED DESCRIPTION

The following description provides specific examples of techniques that can be used in association with one or more computing devices to increase the richness and productivity of user experiences via an information navigation facility. While the description provides many examples in the context of a bank branch, the techniques described herein are not limited to banking contexts and, rather, can be applied in any type of environment associated with computing devices, including environments associated with commercial activities other than banking, home environments, environments at sporting events, retail environments, manufacturing environments, workplace environments, customer service environments, entertainment environments, science or research environments, educational environments, transportation environments, etc. Depending on the environment, increasing the richness and productivity of user experiences in accordance with some embodiments may improve customer retention, increase the value of individual customer relationships, reduce costs, result in higher sales, drive sales to new customers, and provide many other personal and/or commercial benefits.

I. Sample Representative Environment

Figure 1:
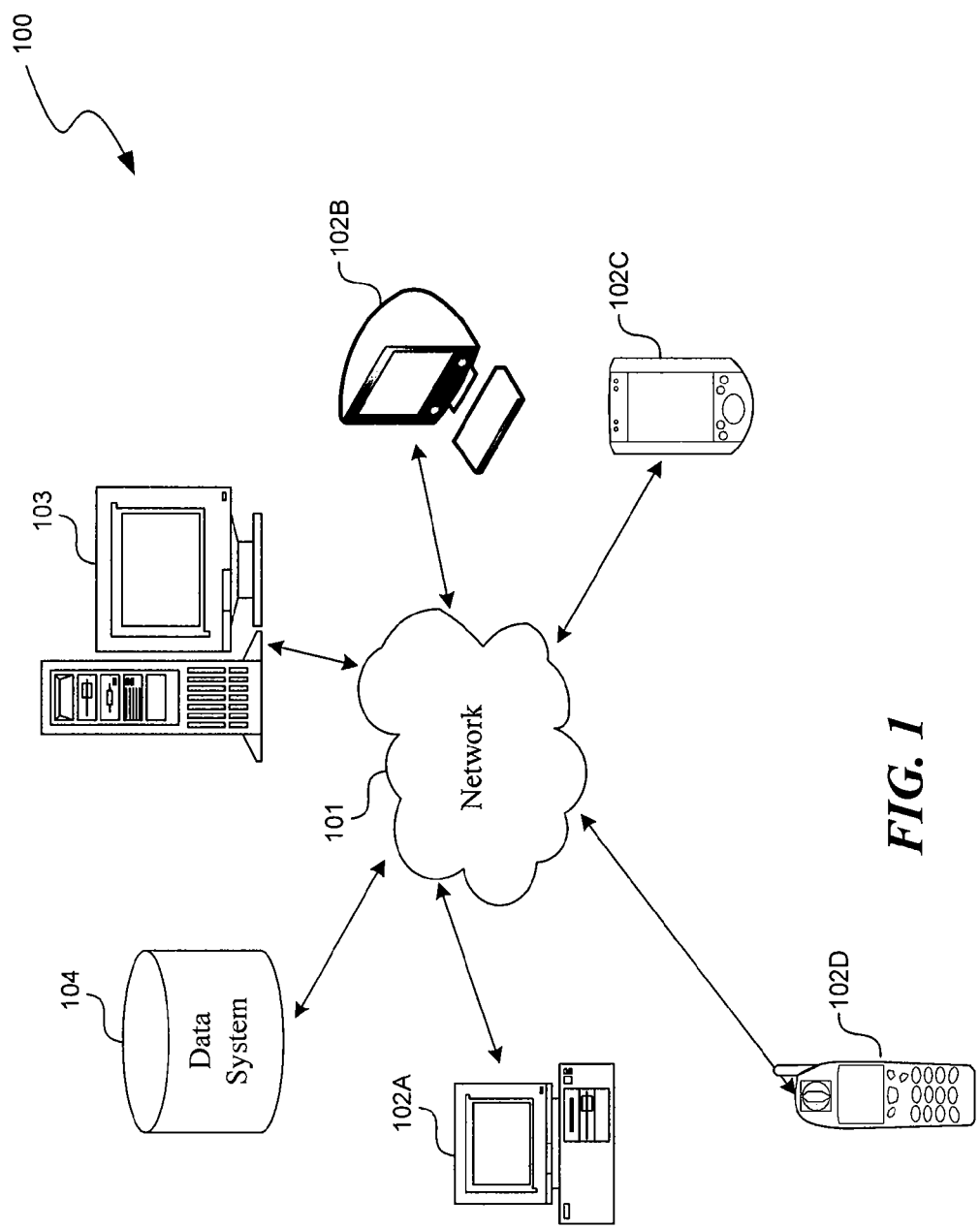
FIG. 1 is a block diagram showing an example of an environment in which the information navigation facility may be implemented.

Referring to FIG. 1, the following is intended to provide an exemplary overview of one suitable environment 100 in which the information navigation facility may be implemented. Generally described, the environment 100 may comprise one or more user devices 102A, 102B, 102C, 102D. The user devices 102A, 102B, 102C, 102D may function independently and/or may be configured for network communication with, for example, at least one server 103 and/or at least one data system 104. The user devices 102A, 102B, 102C, 102D may include personal computers (PCs) 102A, customer terminals 102B, and small form factor devices such as personal digital assistants (PDAs) 102C, mobile telephones 102D, etc. The user devices 102A, 102B, 102C, 102D and the server depicted in FIG. 1 are configured to electronically communicate via a network 101. The network 101 may include aspects of a local area network (LAN) or a larger network, such as a wide area network (WAN) or the Internet, and may also include aspects of a wireless network. The environment 100 may be configured to exchange documents, commands, and other known types of information between the user devices 102A, 102B, 102C, 102D and the server 103. As will be appreciated by those skilled in the art and others, the environment 100 shown in FIG. 1 is a simplified example of one suitable system for implementing aspects of the invention and the invention is not limited to this example.

User devices 102A, 102B, 102C, 102D shown in FIG. 1 may be formed from any one of a number of different computer products. In addition to the examples described above, the user devices also may be formed by a server or a two-way pager. As will be appreciated by those of ordinary skill in the art or others, the architecture of the user devices 102A, 102B, 102C, 102D may take on any suitable form, such as the computer architecture illustrated in FIG. 2 or the mobile device architecture of FIG. 3. Examples of components of the user devices 102A, 102B, 102C, 102D include a processing unit, a display, and a memory unit. The memory unit may store the program code necessary for operating the user devices and for generating a graphical user interface (GUI) on the display that includes features of the information navigation facility. In addition, one or more of the user devices 102A, 102B, 102C, 102D include a network interface for providing communication with the network 101. The network interface may be configured for use with any wired or wireless network connection, and may be used with any suitable communication protocol, such as the TCP/IP protocol or one or more wireless communication protocols.

Figure 2:
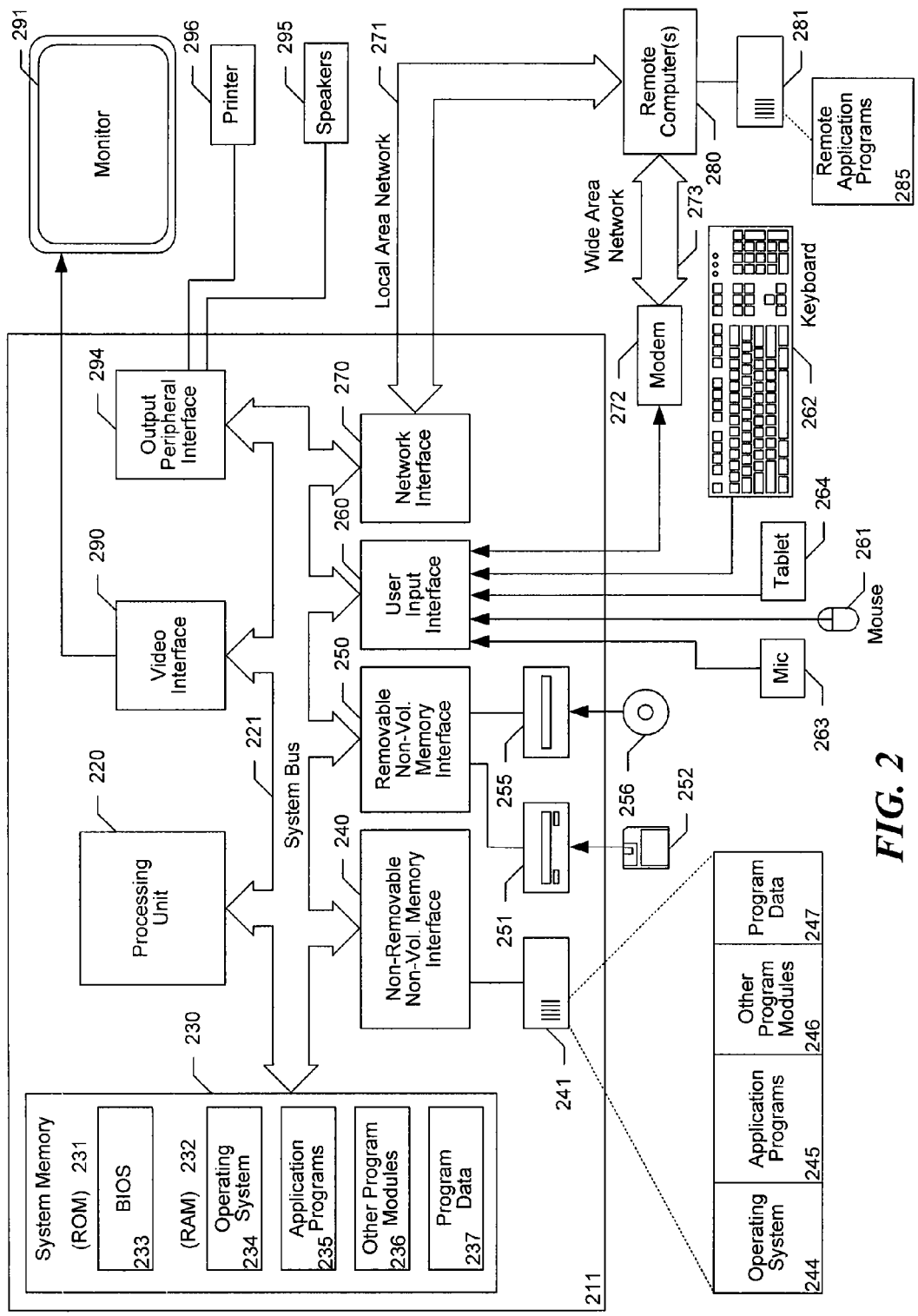
FIG. 2 is a block diagram showing an example of a computer system in which aspects of the information navigation facility may be implemented.

With reference to FIG. 2, an exemplary system for implementing the information navigation facility includes a general purpose computing device in the form of a computer 211. In one illustrative example, the computer 211 is a terminal for use by bank employees in providing customer service to bank customers. Components of the computer 211 may include, but are not limited to, a processing unit 220, a system memory 230, and a system bus 221 that couples various system components including the system memory 230 to the processing unit 220. The system bus 221 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 211 typically includes a variety of computer-readable media. Computer-readable media can be any available media that can be accessed by the computer 211 and include both volatile and nonvolatile media and removable and nonremovable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computer 211. Communication media typically embody computer-readable instructions, data structures, program modules, or other data in a modulated data signal, such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection and wireless media such as acoustic, RF, infrared, and other wireless media. Combinations of any of the above should also be included within the scope of computer-readable media.

The system memory 230 includes computer storage media in the form of volatile and/or nonvolatile memory such as read only memory (ROM) 231 and random access memory (RAM) 232. A basic input/output system (BIOS) 233, containing the basic routines that help to transfer information between elements within the computer 211, such as during start-up, is typically stored in ROM 231. RAM 232 typically contains data and/or program modules that are immediately accessible to and/or presently being operated on by the processing unit 220. By way of example, and not limitation, FIG. 2 illustrates an operating system 234, application programs 235, other program modules 236, and program data 237.

The computer 211 may also include other removable/non-removable, volatile/nonvolatile computer storage media. By way of example only, FIG. 2 illustrates a hard disk drive 241 that reads from or writes to nonremovable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tapes, solid state RAM, solid state ROM, and the like. The hard disk drive 241 is typically connected to the system bus 221 through a nonremovable memory interface such as an interface 240, and the magnetic disk drive 251 and the optical disk drive 255 are typically connected to the system bus 221 by a removable memory interface, such as an interface 250.

The drives and their associated computer storage media, discussed above and illustrated in FIG. 2, provide storage of computer-readable instructions, data structures, program modules, and other data for the computer 211. In FIG. 2, for example, the hard disk drive 241 is illustrated as storing an operating system 244, application programs 245 (including aspects of the information navigation facility), other program modules 246, and program data 247. Note that these components can either be the same as or different from the operating system 234, application programs 235, other program modules 236, and program data 237. The operating system 244, application programs 245, other program modules 246, and program data 247 are given different numbers herein to illustrate that, at a minimum, they are different copies.

In accordance with the information navigation facility and with other user interface schemes, a user may enter commands and information into the computer 211 through input devices such as a tablet or electronic digitizer 264, a microphone 263, a keyboard 262, and a pointing device 261, commonly referred to as a mouse, trackball, or touch pad. Other input devices not shown in FIG. 2 may include a joystick, game pad, satellite dish, scanner, or the like. These and other input devices are often connected to the processing unit 220 through a user input interface 260 that is coupled to the system bus 221, but may be connected by other interface and bus structures, such as a parallel port, game port, or a universal serial bus (USB). A monitor 291 or other type of display device is also connected to the system bus 221 via an interface, such as a video interface 290. The monitor 291 may also be integrated with a touch-screen panel or the like. Note that the monitor 291 and/or touch-screen panel can be physically coupled to a housing in which the computer 211 is incorporated, such as in a tablet-type personal computer. In addition, computing devices such as the computer 211 may also include other peripheral output devices such as speakers 295 and a printer 296, which may be connected through an output peripheral interface 294 or the like.

The computer 211 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 211, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise wide computer networks, intranets, and the Internet. For example, in the present information navigation facility, the computer 211 may comprise the destination machine to which data (e.g., bank customer data) is being migrated, and the remote computer 280 may comprise the source machine. Note, however, that source and destination machines need not be connected by a network or any other means, but instead, data may be migrated via any media capable of being written by the source platform and read by the destination platform or platforms.

When used in a LAN networking environment, the computer 211 is connected to the LAN 271 through a network interface or adapter 270. When used in a WAN networking environment, the computer 211 typically includes a modem 272 or other means for establishing communication over the WAN 273, such as the Internet. The modem 272, which may be internal or external, may be connected to the system bus 221 via the user input interface 260 or other appropriate mechanism. In a networked environment, program modules depicted relative to the computer 211, or portions thereof, may be stored in the remote memory storage device 281. By way of example, and not limitation, FIG. 2 illustrates remote application programs 285 as residing on the memory storage device 281. It will be appreciated that the network connections shown are exemplary and other means of establishing a communication link between the computers may be used.

While various functionalities and data are shown in FIG. 2 as residing on particular computer systems that are arranged in a particular way, those skilled in the art will appreciate that such functionalities and data may be distributed in various other ways across computer systems in different arrangements. While computer systems configured as described above are typically used to support the operation of the information navigation facility, one of ordinary skill in the art will appreciate that the information navigation facility may be implemented using devices of various types and configurations, and having various components.

Figure 3:
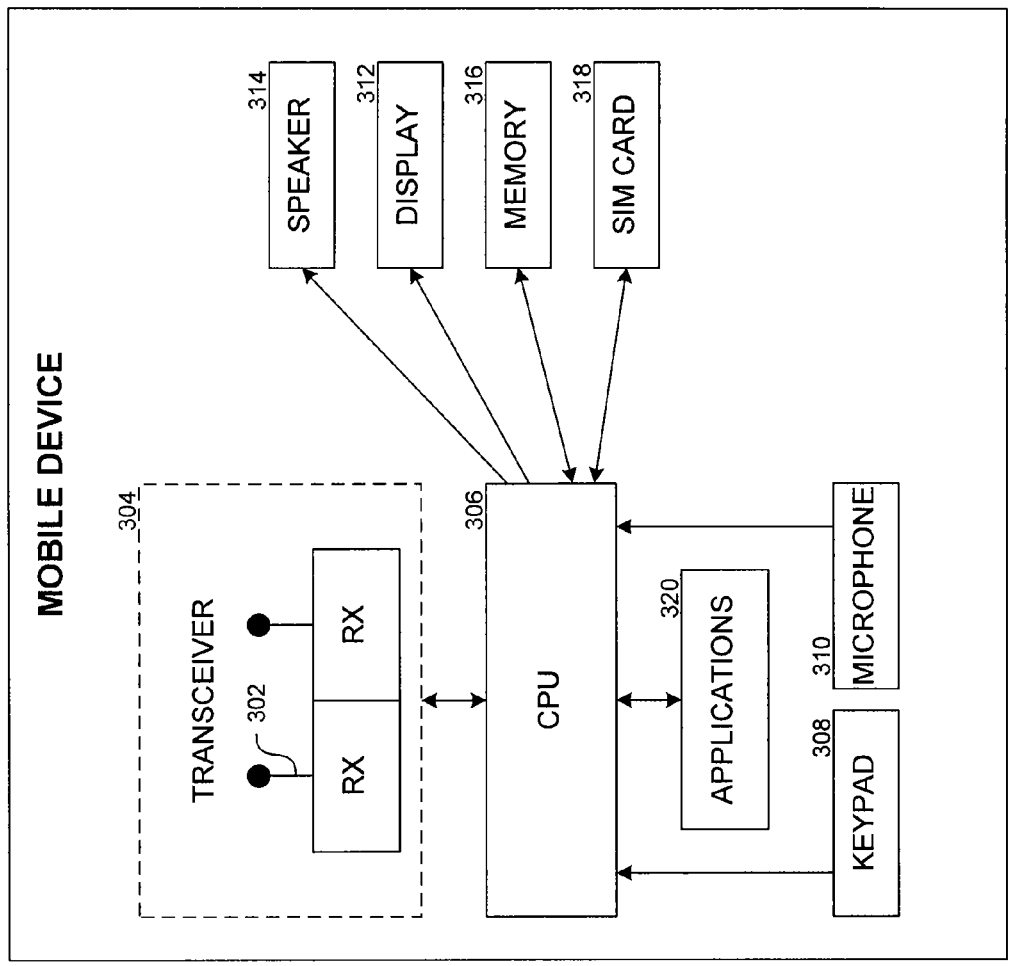
FIG. 3 is a block diagram showing an example of a mobile device in which aspects of the information navigation facility may be implemented.

FIG. 3 is a block diagram showing an example of a mobile device, such as the user device 102D of FIG. 1. While a mobile phone is shown as the mobile communication user device 102D in FIGS. 1 and 3, those skilled in the art will appreciate that aspects of the information navigation facility can be practiced with other devices and configurations, including mobile Internet appliances, hand-held devices, wearable computers, multi-processor systems, microprocessor-based or programmable consumer electronics, set-top boxes, PDAs, portable laptop computers, and the like. The term "mobile device" is intended to include all such devices.

The mobile user device 102D has one or more internal or external antennas 302 for receiving and transmitting electromagnetic signals such as radio frequency signals. A transceiver 304 is connected to the antenna(s) 302 and typically provides modulation and demodulation of the transmitted and received signals, respectively. A processor unit 306 connected to the transceiver 304 may comprise a signal processor, microprocessor, ASIC, or other control and processing logic circuitry. The processor unit 306 may perform signal coding, data processing, input/output processing, power control, and other functions necessary for implementing a mobile device. A user (e.g., a bank customer) may provide input to the processor unit 306 via a keypad 308, microphone 310, or display/touch pad 312, including gestures and other input for use with the information navigation facility. In turn, the processor unit 306 may provide information to the user via the display/touch pad 312 or a speaker 314.

The processor unit 306 may access information from, and store information in, a nonremovable memory 316 or a removable memory 318. The nonremovable memory 316 may consist of RAM, ROM, a hard disk, or other well-known memory storage technologies. The removable memory 318 may consist of Subscriber Identity Module (SIM) cards, which are well-known in GSM communication systems, or other well-known memory storage technologies, such as "smart cards." Generic applications 320 such as wireless content browser applications and address book applications may be implemented in either the removable memory 318 or the nonremovable memory 316. The removable memory 318 and/or the nonremovable member 316 may also be configured or programmed to support complex user interfaces and full color graphics. The removable memory 318 and/or the nonremovable member 316 may also be configured or programmed to run an application that provides various aspects of the information navigation facility, as well as an application that provides information accessible (e.g., bank account information) by the information navigation facility.

II. User Interface Solutions for Increasing the Productivity of User Experiences One primary use of computing devices is for the access and/or management of information. For example, when a customer walks into a bank, customer information for that customer may be displayed on a customer service representative's computer screen. The customer service representative may then use the displayed information, and possibly enter in additional information to execute a customer request (e.g., make a deposit, make a withdrawal, check an account balance, open/close an account, etc.). In this example, customer account information may be displayed on the customer service representative's computer screen as a series of expandable information sets (e.g., arranged hierarchically, chronologically, etc.). For example, the customer's name may be at a high level of the hierarchy, with customer accounts at a next level, specific transactions at a next lower level, etc.

Given an information presentation scheme such as that described above, when the information navigation facility is not implemented, a user (e.g., bank employee) typically clicks with a mouse on a selection to expand each level of information of the information hierarchy. While such techniques for allowing information access are quite common, it may often take multiple access attempts/mouse clicks to access specific items of information that are buried deep in the hierarchy of information (e.g., to determine whether a specific check has been cashed). This ultimately results in a negative user experience due to longer customer wait times, multiple information access attempts, etc.

Figure 4:
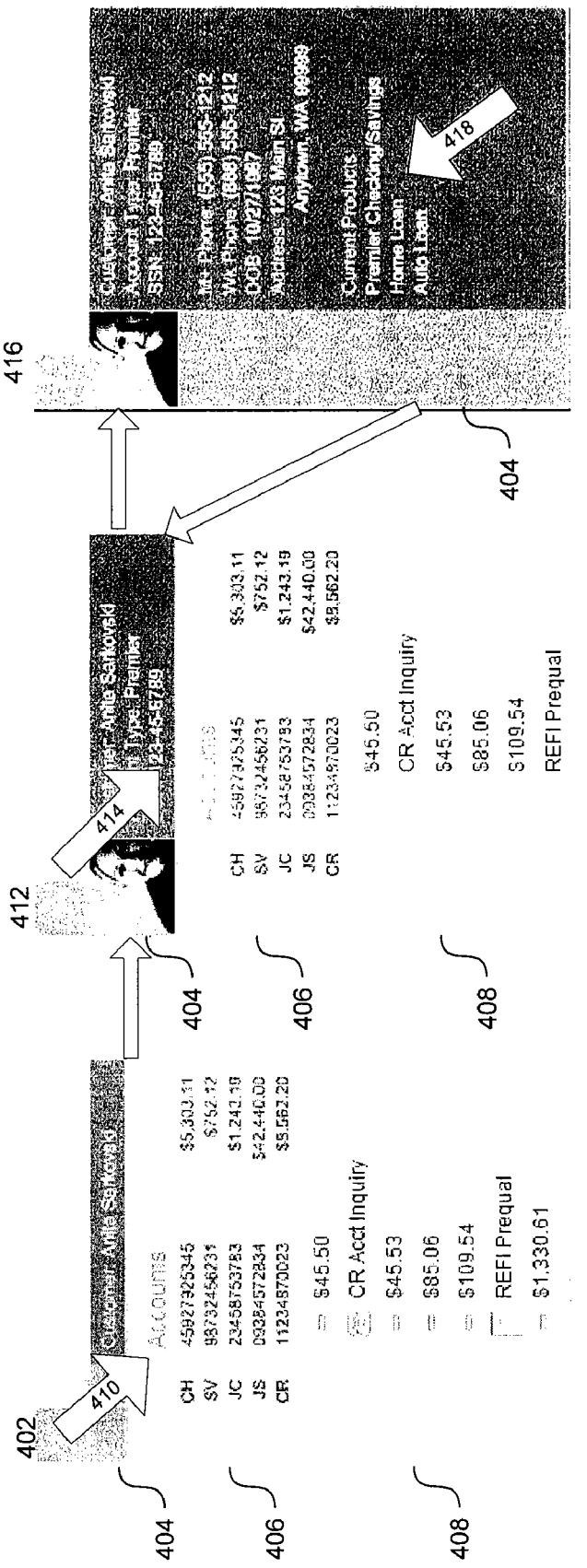
FIG. 4 is a display diagram showing an example of screen shots or views depicting seamless "zoom and scroll" navigation at a computing device.

FIG. 4 provides an example of a user interface solution for high-level to detail-level information navigation. To facilitate information access, the information navigation facility provides a 360 degree interaction solution that allows a user (e.g., bank employee) to scroll up and down in a list, as well as expand and contract the information on that list (e.g., using a single stylus, touch screen, mouse, or joystick gesture). In some embodiments, gestures are used to quickly expand and minimize subareas of information to maintain focus and workflow efficiency without having to navigate to new screens. For example, users may be able to "drill" into or out of information with quick swipes of a stylus, while at the same time scrolling up or down to see the desired information (as shown by the arrows depicted in FIG. 4).

To illustrate, the first screen 402 of FIG. 4 displays various aspects of account information for customer "Anita Sarkovski," including customer information 404, customer account information 406, and customer account details information 408. A user input event depicted as a diagonal arrow 410, when processed, causes the display of a more detailed view of the customer information 404, as shown in screen 412. In this example, the user input event does not cause changes in the display of the customer account information 406 and the customer account details information 408 because it was directed at the top portion of the screen 402, which spatially corresponds to the customer information 404. A second user input event depicted as diagonal arrow 414 causes further expansion of the customer information 404, as well as additional downward screen scrolling, so that the entirety of screen 416 is filled with an even more detailed view of the customer information 404. In this example, additional downward scrolling, while not illustrated, would result in the display of the unchanged customer account information 406 and customer account details information 408.

To move back to the less detailed display of customer account information (e.g., as shown in screen 412), a third user input event depicted as an upwardly directed diagonal arrow 418 causes contraction of the customer information 404, as well as upward screen scrolling.

FIG. 5 is a display diagram illustrating further aspects of the information navigation facility in one embodiment. In particular, FIG. 5 shows navigation of the customer account details information 408 of FIG. 4, which in this particular example is a chronologically arranged collection of information. As shown in screen 502, at a high level, the user sees only the headers or titles of the content. As the user zooms in/out by making a single swiping motion of a stylus, mouse, pen, etc., in a specified direction, he or she is able to expand the content and view more details such as check numbers, notes, and even check images (screens 504 and 506), while at the same time scrolling up/down as needed. Likewise, a swipe in the opposite direction will contract the content back down, for a more summarized view and allow the user to scroll as desired.

Despite the expanding and/or contracting of information, one possible effect is that the screen or view appears to remain continuous from the user's perspective. In other words, while the density of the displayed information may change, the user does not have the feeling that he or she is viewing a different screen each time there is a change in the hierarchy/level of information that is being viewed. Rather, it appears to the user that a single screen is being populated (or depopulated) with information as the user proceeds. In this way, a user can quickly understand the key milestones in a customer's history and then view quickly accessible details on those interactions with the mere single gesture of a mouse or pen. Great time savings can be achieved and usability gained by allowing users to drill deeper on content without leaving the context of their given workspace. FIG. 5 illustrates the continuity of workspace context that is provided by some embodiments of the invention.

The effect of the swiping or gesture may vary from implementation to implementation, and various types of motions may have different effects. For example, factors such as gesture direction, length, speed, etc., may each affect the outcome of the gesture. Depending on the number of user input options that the application needs to provide from a single view, the information navigation facility may provide an interface solution that may be as complicated or simple as needed.

Similar user interface schemes may be applied in the context of mobile device applications. For example, as the retail banking industry develops solutions centered on providing a "single view of the customer," certain roles may involve leveraging mobile devices associated with various form factors (e.g., device input and display size) to access customer information. In such contexts, customer experience and employee productivity may depend, in large part, on how easy it is to access and interact with information on mobile devices. It may be useful to display data across various form factors (e.g., large vs. small) without the need for specialized, device-specific, front-end applications.

III. System Flows

Figure 6:
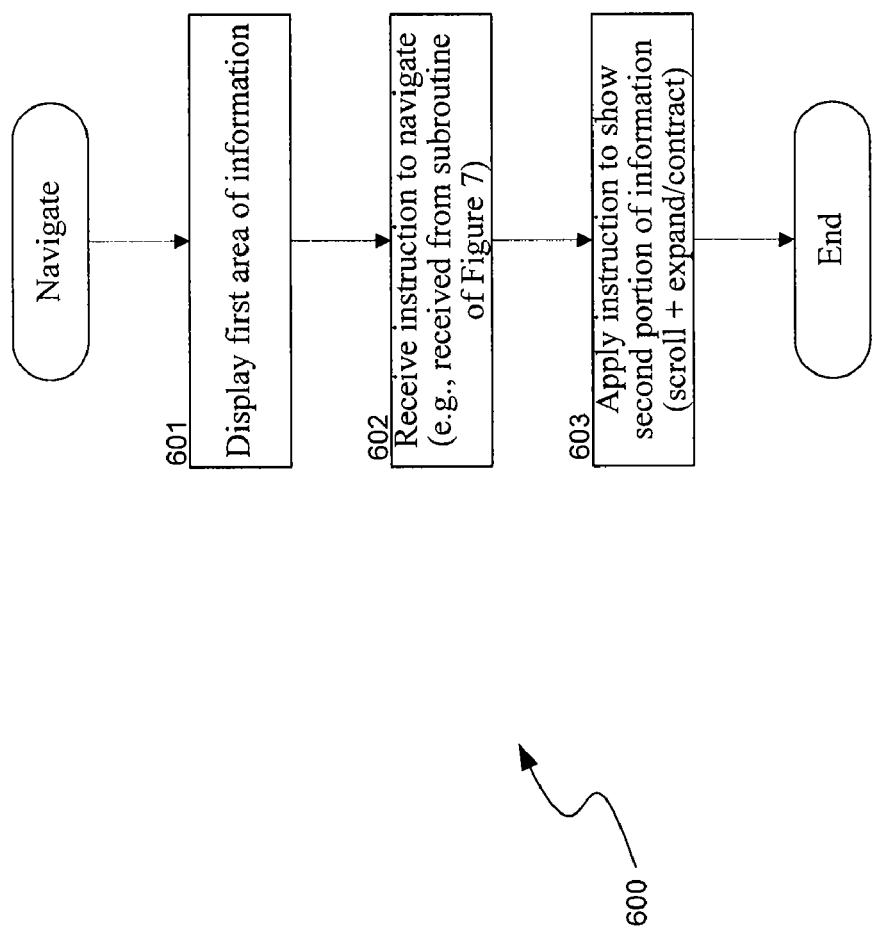
FIG. 6 is a flow diagram showing an example of a routine associated with the information navigation facility as implemented in the computing devices of FIGS. 2 and/or 3.

FIG. 6 is a flow diagram showing an example of a routine associated with the information navigation facility as implemented in the computing devices of FIGS. 2 and/or 3.

At block 601, the routine 600 displays a first area of information associated with a navigable collection of information. In some cases, the collection of information is navigable using both scrolling and expansion/contraction. For example, the collection of information may be displayed such that only a portion of consecutive information can be viewed on the screen at a given time. Scrolling the screen (e.g., horizontally or vertically) allows new lines or portions of information to appear at the edge of the display screen, while other lines or portions of information move over. For example, when dealing with textual data, when scrolling downward, each new line appears at the bottom of the screen and all the other lines move up one row, so that the top line disappears.

The collection of information may also be subject to expansion/contraction, sometimes referred to as drilling and/or zooming in/out. For example, it may be possible to display different levels of detail with respect to given information. At a high level, the information may include a summarized level of information. At progressively lower levels, the detail of the displayed information may increase. This concept of expansion/contraction can be applied to many different types of information, including both textual and graphical information.

Figure 7:
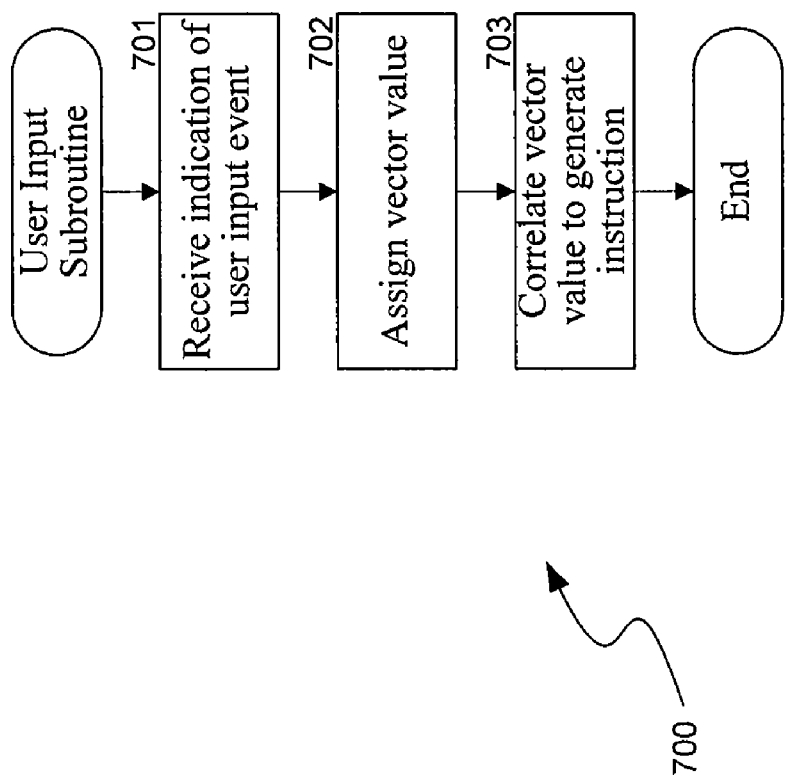
FIG. 7 is a flow diagram showing an example of a user input subroutine used in conjunction with the routine of FIG. 6 in some embodiments.

At block 602, the routine 600 receives an instruction to display a second area of information associated with the navigable collection of information. In some cases, this received instruction is generated by a user input subroutine, an example of which is described with respect to FIG. 7. Referring to FIG. 7, at block 701, the user input subroutine 700 receives a user-initiated physical contact event (e.g., an event that includes user contact with at least one external portion associated with the computing device such as a mouse, joystick, or touch screen). At block 702, the user input subroutine 700 assigns a vector value (e.g., a value having both a length and a direction, which may correspond to the length and direction of the user-initiated physical contact event) to the physical contact event. At block 703, the user input subroutine 700 correlates the vector value to a combination scrolling/expansion or scrolling/contraction action to generate the instruction of block 602.

Referring back to FIG. 6, at block 603, the routine 600 displays the second area of information associated with the navigable collection of information. This displaying includes applying the received instruction to navigating from the first area of information to the second area of information by applying both the scrolling action and the expansion/contraction action substantially simultaneously. Accordingly, this may result in sliding a horizontal or vertical presentation of content across a screen or display window and moving from a summarized view of information in the collection to a more detailed view of information in the collection (i.e., expansion) and/or moving from the more detailed view of information in the collection to the summarized view of information in the collection (i.e., contraction).

In general, any of the computing devices described above may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

Embodiments may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

From the foregoing, it will be appreciated that specific embodiments have been described herein for purposes of illustration, but that various modifications may be made without deviating from the spirit and scope of the invention. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method in a computing device for interactions between the computing device and a human user, the method comprising:
    displaying a first area of information associated with a navigable collection of information, wherein the navigable collection of information is navigable using both scrolling and expansion/contraction, wherein the scrolling includes sliding a horizontal or vertical presentation of content across a screen or display window associated with the computing device, and wherein the expansion/contraction facilitates moving from a summarized view of information in the collection to a more detailed view of information in the collection and/or moving from the more detailed view of information in the collection to the summarized view of information in the collection;
    receiving an instruction to display a second area of information associated with the navigable collection of information, wherein the instruction is based on processing of a user-initiated physical contact event with at least one external portion of the computing device, the processing including:
        assigning a vector value to the user-initiated physical contact event, the vector value having both a length and a direction related to a length and direction of the user-initiated physical contact event; and
        correlating the vector value to both a scrolling action and an expansion/contraction action; and
    based on the received instruction, displaying the second area of information associated with the navigable collection of information, wherein the displaying includes navigating from the first area of information to the second area of information by applying both the scrolling action and the expansion/contraction action substantially simultaneously.

2. The method of claim 1 wherein the user-initiated physical contact event with at least one external portion of the computing device includes a mouse or joystick gesture.

3. The method of claim 1 wherein the user-initiated physical contact event with at least one external portion of the computing device includes a stylus or touch screen gesture.

4. The method of claim 1 wherein the user-initiated physical contact event corresponds with a single and discrete continuous motion made by the user.

5. The method of claim 1 wherein the collection of information includes hierarchically arranged information having multiple levels.

6. The method of claim 1 wherein the collection of information does not include hierarchically arranged information.

7. The method of claim 1 wherein the collection of information includes chronologically arranged information.

8. The method of claim 1 wherein the collection of information includes information comprising an image or multiple images.

9. The method of claim 1 wherein the collection of information includes information comprising an interactive map.

10. A method for facilitating the navigation of displayable information:
    receiving an indication of a discrete physical contact event with a user input device, wherein the discrete physical contact event is associated with a user request for navigating an assembly of displayable information, and wherein a first portion of the assembly of displayable information is being displayed on a computer screen or window at the time the indication is received;
    determining a navigation action based on the received indication, wherein the navigation action includes either
        (a) both scrolling and expansion of the first portion of displayable information that is being displayed on the computer screen or window at the time the indication is received, wherein the scrolling and expansion occur simultaneously or nearly simultaneously, or
        (b) both scrolling and contraction of the first portion of displayable information that is being displayed on the computer screen or window at the time the indication is received, wherein the scrolling and contraction occur simultaneously or nearly simultaneously; and
    applying the determined navigation action to the assembly of information resulting in a display of a second portion of the assembly of information.

11. The method of claim 10 wherein the scrolling includes sliding a horizontal or vertical presentation of information across a screen or display window.

12. The method of claim 10 wherein the expansion includes moving from a summarized view of information to a more detailed view of information and wherein the contraction includes moving from a detailed view of information to a more summarized view of information.

13. The method of claim 10 wherein the user-initiated physical contact event includes a single gesture-based motion and wherein the single gesture-based motion is a discrete unidirectional motion having a measurable duration and velocity.

14. The method of claim 10 wherein determining the navigation action includes:
    assigning a vector value to the discrete physical contact event, the vector value having both a length and a direction related to a length and direction of the discrete physical contact event; and
    correlating the vector value to both a scrolling action and an expansion/contraction action.

15. The method of claim 10 wherein a subset of information associated with the assembly of information is displayed both before and after applying the determined navigation action to the assembly of information resulting in a display of a second portion of the assembly of information.

16. A system for interactions between a computing device and a human user, the displaying comprising:
    an output component configured to display areas of information associated with a navigable collection of information, wherein the navigable collection of information is navigable using both scrolling and expansion/contraction, wherein the scrolling includes sliding a horizontal or vertical presentation of content across a screen or display window, and wherein the expansion/contraction facilitates moving from a summarized view of information in the collection to a more detailed view of information in the collection and/or moving from the more detailed view of information in the collection to the summarized view of information in the collection;
    an input component configured to receive user-initiated physical contact events functioning as user input; and
    a processing component configured to assign a vector value to at least some of the user-initiated physical contact events, the vector value having both a length and a direction related to a length and direction of the user-initiated physical contact event, wherein the processing component is further configured to correlate the vector value to both a scrolling action and an expansion/contraction action, wherein both the scrolling action and the expansion/contraction action are simultaneously or nearly simultaneously applicable to the navigable collection of information displayed by the output component.

17. The system of claim 16 wherein at least some of the user-initiated input events include option selection events that allow users to identify selectable items in the navigable collection of information.

18. The system of claim 16 wherein the computing device is a personal computer (PC).

19. The system of claim 16 wherein the computing device is a small form factor device.

20. The system of claim 16 wherein the computing device is a mobile phone or personal digital assistant.

\* \* \* \* \*